Jan. 4, 1949.   J. E. STERNER   2,458,033
MICROPHONICS TESTER
Filed April 24, 1943   2 Sheets-Sheet 1
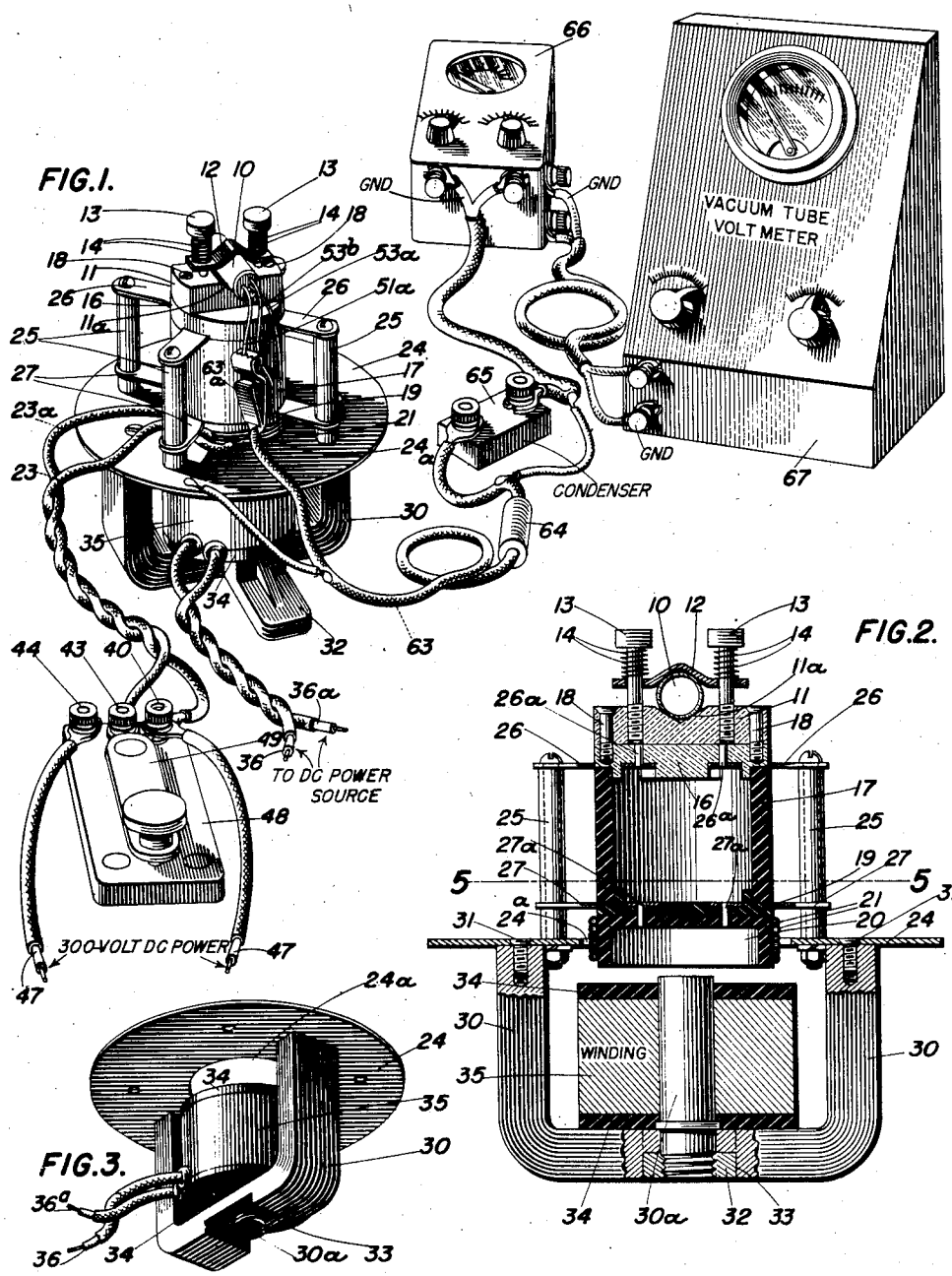
INVENTOR
JOHN E. STERNER
BY
ATTORNEY Jan. 4, 1949.  J. E. STERNER  2,458,033
MICROPHONICS TESTER
Filed April 24, 1943  2 Sheets-Sheet 2

INVENTOR
JOHN E. STERNER
BY
ATTORNEY

Patented Jan. 4, 1949

2,458,033

UNITED STATES PATENT OFFICE 2,458,033

MICROPHONICS TESTER

John E. Sterner, Erie, Pa., assignor to the United States of America as represented by the Secretary of the Navy Application April 24, 1943, Serial No. 484,457

1 Claim. (Cl. 315—364)

This invention relates to the testing of vacuum tubes, and has particular reference to a novel method and apparatus for determining the microphonics of a vacuum tube by imparting mechanical shock thereto and registering the resulting vibrations set up in the tube by means of an indicator connected to the output of the tube. The new method is simple and accurate and may be practiced expeditiously by the apparatus of the invention.

One object of the invention resides in the provision of a novel method for determining the microphonics of a vacuum tube. According to the new method, the vacuum tube is energized and at the same time is subjected to a mechanical shock, and while it is under the influence of the shock, its output is measured, preferably through an audio frequency amplifier, to indicate the vibrations set up in the tube by the mechanical shock.

Another object of the invention is to provide a novel microphonics testing apparatus for vacuum tubes, by which the method of the invention may be practiced quickly and easily. An apparatus made in accordance with the invention comprises a device for imparting to the vacuum tube a mechanical shock of a predetermined magnitude, the tube being clamped to the device in any desired manner and energized from a suitable current source. Connected to the vacuum tube is an indicating means preferably in the form of a vacuum tube volt meter operated by the tube output through a condenser and an audio frequency amplifier. With this construction, when the apparatus is operated to impart a shock to the tube, the vibrations set up in the tube by the shock are registered on the volt meter or other indicating device, whereby the operator may determine readily whether the tube, when shocked, will set up microphonics having audio frequencies within the range of frequencies in which the tube is to be operated.

Still another object of the invention resides in the provision of a novel apparatus for subjecting vacuum tubes to a uniform mechanical shock for microphonic testing of the tubes. The mechanical shocking apparatus comprises a movable support for the vacuum tube, and a movable coil adapted to be energized to move the support abruptly by the force of magnetism in the electromagnet. In the preferred construction of the apparatus, the support for the vacuum tube is provided with resilient means for clamping the tube thereto, the clamping means being also mounted on resilient supporting means so that it is adapted to vibrate under the action of the movable coil. The movable coil is preferably energized by current pulsing means comprising a condenser, a source of current for charging the condenser, and switching means for alternately connecting the condenser to the current source and the movable coil. Thus, when the condenser has been charged, the switch is operated to connect it to the movable coil, whereupon a current pulse is sent through the coil to cause an abrupt movement of the tube of a predetermined magnitude.

These and other objects of the invention may be better understood by reference to the accompanying drawings, in which:

Fig. 1 is a schematic view of one form of the new testing apparatus;

Fig. 2 is a vertical sectional view of the device shown in Fig. 1 for imparting mechanical shock to the vacuum tube;

Figs. 3 and 4 are perspective views of parts of the device shown in Figs. 1 and 2;

Figure 6:
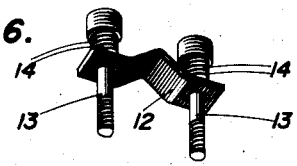
Figs. 6, 7 and 8 are perspective views of other parts of the device shown in Fig. 2, and, Fig. 9 is a wiring diagram of the new apparatus.
Figure 7:
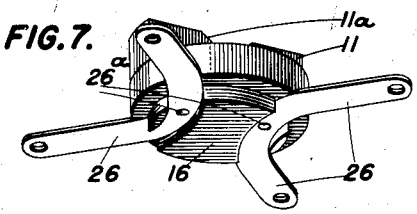
Figure 8:
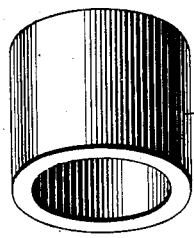
Figure 5:
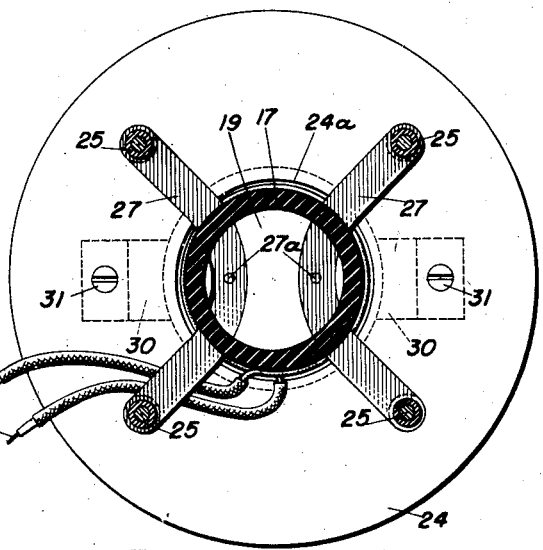
Fig. 5 is a sectional view on the line 5—5 in Fig. 2.

Referring to the drawings, the vacuum tube 10 to be tested is supported on a unit for subjecting the tube to mechanical shock, which comprises a cradle 11 having a notch 11a for receiving the tube, the cradle being preferably made of aluminum. It is desired to point out that the use of a light weight metal cradle aids in electrically shielding the tube under test. The tube is held on the cradle by clamping means comprising a plate 12 engaging the upper surface of the tube and bent to conform generally to the contour of the tube. Extending through the plate on each side of the tube are clamping screws 13 threaded into the cradle 11, and between the plate and the heads of the screws are compression springs 14. The cradle 11 is secured to a cap 16 which closes the upper end of a tube 17 of insulating material. The cradle may be secured to the cap in any suitable manner, as by means of screws 18. At its lower end, the tube 17 is closed by a cap 19 secured to the upper end of a movable coil 20, the coil having a winding 21. The winding 21 is adapted to be energized through lead wires 23 and 23a (Fig. 1). The closure caps 16 and 19 are connected to the insulating tube 17 in any suitable manner. The clamping screws 13, as shown, are threaded through the cradle 11 so that their ends abut against the top of cap 16. Accordingly, in clamping the vacuum tube 10 to the cradle, the screws 13 are tightened until they engage the cap 16 and can be tightened no further, whereby the tube is subjected to a predetermined clamping pressure.

The assembly including the cradle 11, insulating tube 17 and movable coil 20 is supported on a plate 24 so that the movable coil projects down through a central opening 24a in the plate. The support for the assembly comprises a plurality of posts 25 on the plate 24 and a set of leaf springs 26 connected between the upper ends of the posts and the cap 16. A similar set of leaf springs 27 is connected between the lower portions of the posts and the lower cap 19. As shown, the leaf springs 26 and 27 form spiders connected to two pairs of posts 25 and are secured to the caps 16 and 19 by rivets 26a and 27a, respectively.

The supporting plate 24 is connected to the ends of the outer arms of a generally E-shaped electro-magnet 30, as by means of screws 31. The pole piece or central arm 30a of the magnet extends through an opening in the crosspiece of the magnet bar and is threaded at its lower end into a base member 32 fitted in a slot 33 in the crosspiece. Thus, the base member 32 and the crosspiece of magnet 30 provide a stable support for the assembly. Disposed between a pair of insulating disks 34 on the central arm 30a is a field winding 35 for energizing the magnet 30. The outer arms of the magnet 30 form one pole of the magnet, while the central arm 30a forms the other pole, the latter being disposed opposite the lower end of the coil 20. Like fields of the coils 20 and 35 will tend to repel each other when coil 20 is energized. The winding 35 is energized through lead wires 36 and 36a connected to a current source 37.

Figure 9:
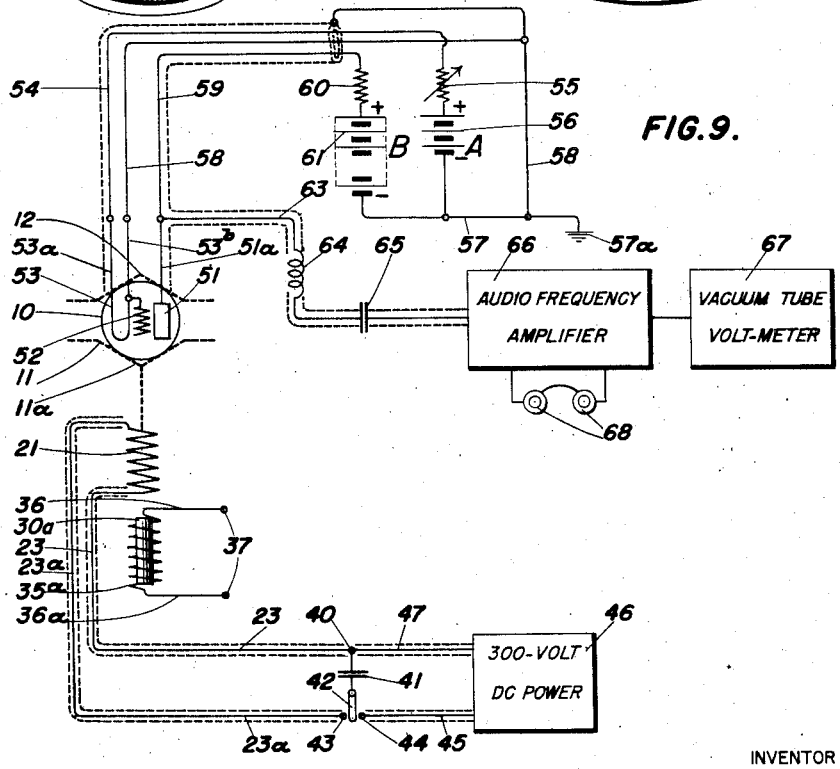

The movable coil 20 is adapted to be energized by a current pulse, which may be provided by the system described hereinafter. As shown in Fig. 9, the lead wire 23 of coil 20 is connected to a terminal 40 which, in turn, is connected to one side of a pulsing condenser 41. The other side of the condenser is connected to a single pole, double throw switch 42 of the snap action type. One terminal 43 of the switch is connected to the other lead wire 23a of coil 20, and the other terminal 44 of the switch is connected through a wire 45 to one side of a D. C. current source 46. A wire 47 connects the other side of the current source to terminal 40. Preferably, the condenser 41 and the double throw switch 42 are contained in a casing 48, which may be made of brass, to shield these parts from the vacuum tube 10 and other elements of the apparatus to be described presently, the switch being operable in the casing by means of a two-position handle 49. The wires 23 and 23a are also shielded by metallic sheathing.

The vacuum tube 10, as shown, is of the triode type, comprising a plate 51, a control grid 52 and a filament 53 mounted in the envelope. A lead wire 53a from one side of the filament is connected through a wire 54 and a potentiometer 55 to the positive side of an A battery 56, the negative side of which is connected to a wire 57 leading to ground, as shown at 57a. A wire 58 connects the wire 57 to a lead wire 53b extending from the other side of the tube filament, the grid 52 being connected directly to the lead 53b. If desired, the grid may be connected to ground through a resistor (not shown). A lead wire 51a from the plate of the tube is connected through a wire 59 and a resistance 60 to the positive side of a B battery 61, the negative side of which is connected to wire 57. The output of the tube 10 is indicated by a suitable device for registering mechanical vibrations set up in the tube. As shown, the plate circuit of the tube is connected by a wire 63 through a radio frequency choke coil 64 and a condenser 65 to an audio-frequency amplifier 66, the output end of which is connected to a vacuum tube volt meter 67. If desired, a pair of head phones 68 may be connected to the output of the amplifier, provided that suitable compensation is made for the extra loading.

In the operation of the apparatus, the vacuum tube 10 to be tested is clamped in the cradle 11 with its lead wires connected to the A and B batteries 56—61 for energizing the tube. The volt meter 67 may be readily connected to the output of the tube by means of a wire clamp 63a connecting wires 63 and 59. The assembly including the movable coil 20 and the magnet 35 is then energized to subject the vacuum tube to a mechanical impact. In the operation of the impact assembly, the switch 42 is first moved to engage contact 44 so that condenser 41 is charged by the current source 46. When the condenser is fully charged, switch 42 is moved into engagement with contact 43, whereupon the charge in condenser 41 is directed through the coil 20 in the form of a pulse. As a result, the forces of magnetism cause the coil 20 to move abruptly away from coil 35. It will be apparent that the vacuum tube 10 and coil 20 move as a unit and, accordingly, when the switch is moved into engagement with contact 43, the vacuum tube is jarred by the abrupt upward movement of the coil 20. The leaf springs 26 and 27 permit vertical movement of the coil 20 and cradle 11 under the action of the current pulse and also permit vibration of the coil and cradle after the pulse has been dissipated in the coil. The resulting mechanical vibrations in the vacuum tube, which set up microphonics, are fed from the tube through coil 64 and condenser 65 to the audio amplifier and the volt meter 67, on which the vibration voltage may be read directly in volts.

With the new system, the usual static tests may be made on the vacuum tube along with the microphonics test. That is, by the use of the head set 68 connected to the output of the audio amplifier, it can be determined by the shot effect whether or not the tube contains gas. Also, the plate and filament voltage and current readings may be made on conventional instruments (not shown) associated with the apparatus. If the tube contains one or more screens, the screen voltage and current measurements may also be made by appropriate meters (not shown). I have found that satisfactory results may be obtained with the new apparatus by using on the vacuum tube a plate voltage of 90 volts along with the rated filament voltage, and a resistor 60 of 100,000 ohms and potentiometer 55 of 60 ohms in the filament circuit. A filament volt meter reading to about 1.5 volts and a plate current meter reading to about 200 microamperes are desirable.

The entire pulsing circuit for the coil 20, from the power unit to the coil, is shielded by the casing 48, so that contact noise is eliminated in the apparatus. A radio frequency choke coil 64 of about 2.5 microhenrys between the tube and the amplifier provides satisfactory results. Due to the shielding in the manner described, the contact noise was found to have an effect of approximately half a volt in the indicator readings, which is of no substantial consequence.

I claim:

Apparatus for testing a vacuum tube, which comprises a support for the tube, means coacting therewith to clamp the tube firmly thereto, resilient means carrying said support and restricting its motion to a single direction, a coil rigidly secured to said support, means providing a strong magnetic field through said coil, a capacitor, means for charging said capacitor, and means for discharging it through said coil, thereby producing a sudden powerful force of very short duration to deflect the support and immediately release it, thus imparting a corresponding mechanical shock to the tube in a known direction.

JOHN E. STERNER.

REFERENCES CITED

The following references are of record in the file of this patent:

UNITED STATES PATENTS

| Number | Name | Date |
| --- | --- | --- |
| 1,540,355 | Mathes | June 2, 1925 |
| 2,278,697 | Gould | Apr. 7, 1942 |